Sept. 14, 1926.

W. H. BOUTELLE

OPHTHALMIC MOUNTING

Filed Jan. 11, 1924

1,599,870

INVENTOR
WILLIAM H. BOUTELLE.
BY
Harry H. Styll.
ATTORNEY

Patented Sept. 14, 1926.

1,599,870

UNITED STATES PATENT OFFICE.

WILLIAM H. BOUTELLE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed January 11, 1924. Serial No. 685,549.

This invention relates to improvements in ophthalmic mountings and relates particularly to endpieces and temple connections thereto as used in spectacle frames.

One of the important objects of the present invention is to provide a spectacle frame and endpiece of such an improved construction that the temple will be permanently held therein in proper alignment.

Another object of the invention is to provide such a mounting wherein the temple butt will be suitably tensioned to prevent same from working loose.

Another object is to provide an improved spectacle endpiece wherein the bearing surface for the clamping screws is considerably increased, thus eliminating the possibility of stripped threads.

Another object is to provide such a device having improved means for lining up the two halves of the endpiece and relieving the clamping screws of transverse strains.

Another object is to provide such a spectacle mounting whereby the lens may be removed from the frame without disturbing the temple connection, and vice versa.

With these and other objects in view, the invention resides in the novel features of construction, combination, and arrangement of parts as hereinafter described, illustrated in the accompanying drawings and specifically pointed out in the appended claims.

In the drawings forming a part of the present specification I have illustrated a preferred embodiment of my invention.

Figure 1 being a front elevation of a mounting made in accordance with my invention.

Similar reference characters designate corresponding parts throughout the several views of the drawing.

Figure 1:
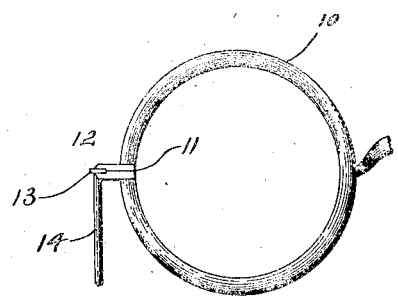
Figure 2:
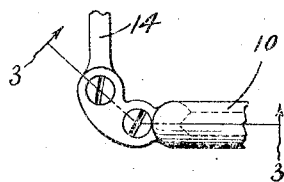
Figure 2 is a fragmentary top plan view.

I have shown my invention applied to an ordinary spectacle frame wherein the reference character 10 designates the usual lens receiving rim which is split as at 11 and equipped with the usual endpiece 12 which carries the forward end 13 of a temple 14.

Figures 3, 4:
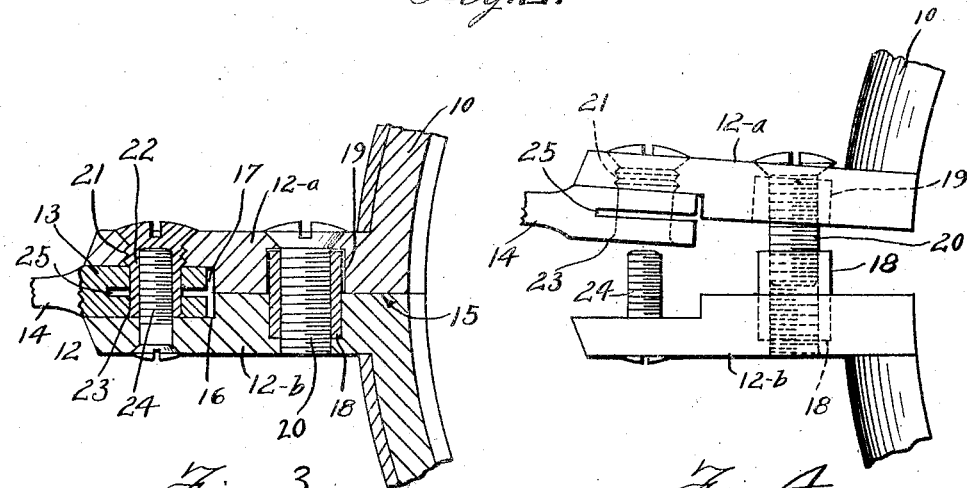
Figure 3 is a sectional view on the line 3—3 of Figure 2 on a greatly enlarged scale, and, Figure 4 is a similar view illustrating how the parts may be disassociated.

By referring especially to Figures 3 and 4, it will be noted that the endpiece 12 is composed of two members $12^a$ and $12^b$, each of which is secured to the meeting extremities of the lens receiving rim or eyewire 10. The two members of the endpiece have a contacting bearing surface 15 adjacent the eye wire and at their outer end their surfaces are relieved as at 16 to form a substantial bifurcation 17, said bifurcation being adapted to receive the enlarged end 13 of the temple 14.

Secured in any desirable manner to the endpiece member $12^b$ is an indexing post 18 which extends beyond the surface 15 and is adapted to be snugly seated within the recess 19 in the endpiece member $12^a$. The post 18 is provided with a longitudinal threaded opening for the reception of the clamping screw 20 which first passes through the member $12^a$ and serves to clamp the two halves of the endpiece together.

The member $12^a$ is provided adjacent its extremity with a threaded opening 21 in which is mounted a tubular bearing 22, said tubular bearing extending into the bifurcation 17 as clearly shown. The member 22 acts as the pivotal post or pintle for the end 13 of the temple 14 and the connection between these two members is such that when the two halves of the endpiece are separated the temple will not become disassociated from the tubular member 22. I may accomplish this result by having one surface of the temple slightly countersunk as shown at 23, and upon assembling, the end of the member 22 may be slightly peened although the amount of such peening should not be sufficient to prevent withdrawal of the temple from the hinge connection when desirable. The screw 24 is inserted as clearly shown through the member $12^b$ and threaded into the tubular member 22, preferably concentric therewith, in order to lock the parts in proper position.

The enlarged end 13 of the temple is suitably slotted or bifurcated as shown at 25 and the size of this member is such as to be a good snug fit between the relieved surfaces 16 of the endpiece. The slot 25 provides sufficient resiliency for the material so that the members will always be in their proper frictional surface contact.

After the parts have been once properly assembled if it should become necessary to change the lens in the eyewire 10, it is merely necessary to loosen the two screws 20 and 24, whereupon the two halves of the endpiece may be sufficiently separated to remove the lens or insert a new one. In the above mentioned separation the temple 14 will not be disturbed in relation to its pivot 22 because of the connection at 23. If, for any reason it should be desirable to remove the temple while the lens is in place it is not necessary to loosen the endpiece members but merely to remove, first, the screw 24 and then the tubular member 22, whereupon the temple can be slipped out very conveniently.

With my improved spectacle construction, the endpieces are always held in proper alignment by virtue of the post or tubular extension 18 being seated within the recess 19 and in this way the screw 20 is entirely relieved of any transverse strains incident to the use of the mounting. Furthermore, it would be apparent that by providing a post 18 as I have done, a much longer thread bearing will be utilized, thus minimizing the tendency of the threads being stripped. Furthermore, it will be obvious that by virtue of the fact that the member 22 engages within the threaded aperture 21 and is in turn engaged by the screw 24, it will be securely locked in place, and this and the temple 14 will always maintain its proper alignment in relation to the eyewire 10.

It will be evident that changes may be made in the minor details of construction and arrangement of parts, and I herein reserve the right to make such changes falling within the scope of the appended claims without departing from the spirit of my invention.

Having thus described my invention, what I claim is:

1. In a device of the character described, a split end piece, one portion bearing on the other and having aligned recesses extending therethrough, each recess having an enlarged portion extending from the bearing surface into its respective end piece portion to a point intermediate thereof and the outer side of the end piece portion, a tubular member seated in the enlarged portion of one recess and secured thereto and extending into the enlarged recess of the other portion, and a screw member through one of the end piece portions extending into the tubular member and through the other end piece portion and adapted to draw the two end piece portions together to retain them in position.

2. In a device of the character described, a split end piece comprising two members, one bearing on the other, each of said portions being recessed to form a bifurcation at the extremity and on the line of contact between the two portions, a temple end having an opening inserted in the bifurcation, a tubular screw inserted through one of the portions into the opening in the temple end, having a smooth bearing surface in engagement with the opening in the temple end and a threaded connection with the end piece portion through which it is placed, and a central tubular recess, an opening in the other end piece portion in line with the tubular recess, and a screw through the opening in the end piece portion engaging the internal walls of the tubular recessed portion.

3. In a device of the character described, a split end piece comprising two portions adapted to fit one on the other, aligned recesses in the two portions extending inwardly from the line of joinder of the two portions, a tubular member placed in the recess of one portion and secured thereto and extending into the recess of the other portion, a screw through one portion extending into the tubular member, adapted to draw the two end piece portions together and hold them in position, a second recess portion in the end piece members forming a bifurcation at the extremities of the two portions and about the line of contact, a temple end having an opening inserted in the bifurcation of the end piece portions, a bearing member inserted through one of the end piece portions into the opening in the temple end, having a smooth bearing portion to engage the walls of the opening in the temple end, a screw threaded portion to engage one of the portions of the end piece and having a central tubular bore, an opening through the other end piece in alignment with the central tubular bore, and a screw through the other end piece entering the tubular bore to hold the temple bearing in position.

WILLIAM H. BOUTELLE.